Feb. 21, 1956          J. Q. WOOD          2,735,828
RECOVERY OF CARBON BLACK
Filed Dec. 29, 1952
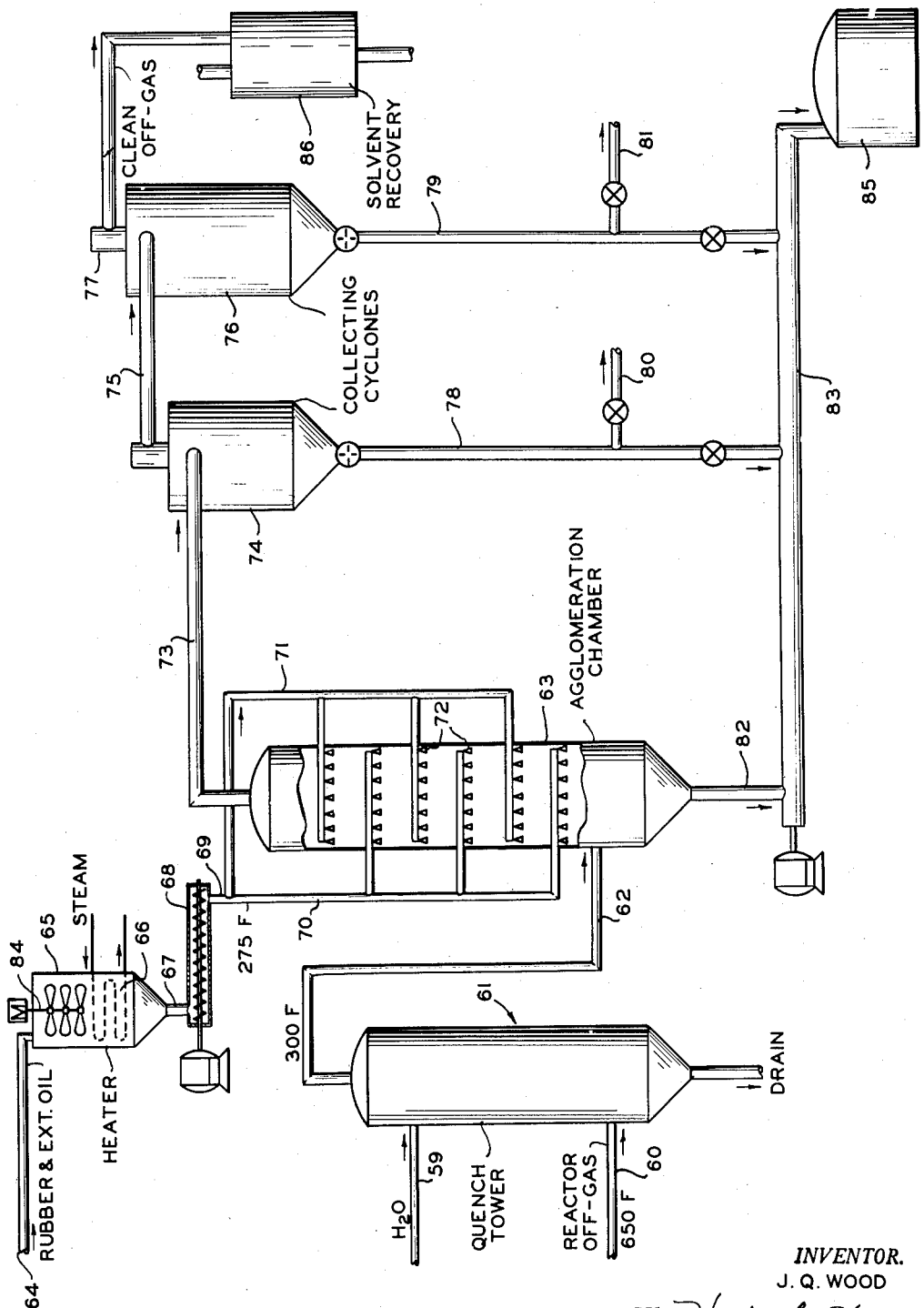
INVENTOR.
J. Q. WOOD
BY *Hudson & Young*
ATTORNEYS

United States Patent Office

2,735,828
Patented Feb. 21, 1956

2,735,828

RECOVERY OF CARBON BLACK

James Q. Wood, Bartlesville, Okla., assignor to Phillips Petroleum Company, a corporation of Delaware Application December 29, 1952, Serial No. 328,350

13 Claims. (Cl. 260—41.5)

This invention relates to the recovery of carbon black. In one aspect it relates to a method for the separation and recovery of carbon black from carbon black production furnace effluents. In another aspect it relates to a method for the separation and recovery of carbon black from carbon black production furnace effluents in which the carbon black is recovered with unvulcanized rubber as a rubber-carbon black mixture.

Prior art teaches the separation of channel carbon black by impinging a smoky flame against a cold surface and scraping the deposited black from this surface. Bag filters and electrostatic precipitators are in common use for separating carbon black from gases resulting from the furnace production of carbon black. Prior art also teaches scrubbing of carbon black containing gases with water or with latex for the production of carbon black slurries. These slurries may be used in master batching operations as such or the slurries may be dried of their water content for the recovery of carbon black with or without the rubber.

An object of my invention is to devise a process for simultaneously recovering carbon black from production furnace effluent gases and mixing the recovered black with rubber in less elaborate and less costly plant equipment than required to carry out these operations separately.

Another object of my invention is to devise a process for recovering carbon black from carbon black production furnace gases and at the same time producing a carbon black-rubber mixture suitable for use in rubber compounding operations.

Still another object of my invention is to devise the above combination process which requires less expensive equipment than that required for separately recovering carbon black from the furnace gases and incorporating the carbon black in the rubber.

Yet another object of my invention is to devise a process for converting carbon black into an easily shippable form.

And another object of my invention is to devise a process for recovering carbon black from carbon black production furnace effluent gases and the simultaneous conversion of the black into an easily shippable form.

Other objects and advantages will be realized upon reading the following disclosure which taken with the attached drawing forms a part of this specification.

In the drawing the figure illustrates diagrammatically a form of apparatus for carrying out the process of my invention.

My invention involves intimately contacting at a relatively high temperature a liquid or substantially liquid mixture of rubber crumb, rubber processing oil and antioxidant with carbon black containing gases for the separation of the black from the gases and recovery of the black as a rubber-oil-antioxidant-carbon black mixture suitable for shipment and use in rubber compounding operations. In the intimate contacting operation, the crumb-oil-antioxidant mixture is heated to a sufficiently high temperature that it is liquid or substantially a liquid and sprayed into a carbon black-rubber contacting operation. In still another embodiment of my invention the rubber crumb containing extender oil is heated to such a temperature that the crumb-oil mixture becomes substantially liquid and this liquid is pumped under high pressure and sprayed in countercurrent relation to carbon black containing gases. In this operation the crumb-oil spray scrubs the carbon black from the suspended gases. In this manner since the rubber crumb-oil composition is sprayed fine droplets of rubber-oil containing carbon black are produced as the product of the process. This material may contain sufficient carbon black required by the rubber compounding recipe or additional black may be used as desired.

A liquid rubber solvent or thinning agent such as benzene or carbon tetrachloride may be added with the rubber and extender passing through conduit 64 into mixer 65. This rubber solvent assists in making the rubber-extender oil sprayable.

In the figure is illustrated an embodiment of my invention in which the crumb is at least partially melted or dissolved or both in an extender or rubber processing oil which was previously incorporated into the crumb. An antioxidant is incorporated to prevent oxidation and degradation of the rubber. In this invention the crumb and extender oil are heated to a temperature above about 275° F. while the carbon black containing gases are introduced into the contacting zone at a temperature of about 300° F. The carbon black from the carbon black production reactors and partial coolers is introduced into a quench vessel 61 by way of line 60. From this line 60 carbon black in furnace gases are introduced at a temperature of about 650° F. into quench tower 61 in which water is sprayed for cooling purposes from a line 59. The carbon black containing gases are removed from the top of this quench tower through a line 62 at a temperature of about 300° F. or above and introduced therefrom into the lower portion of a contacting vessel 63.

Crumb rubber containing extender oil, a suitable antioxidant and a rubber solvent from a source, not shown, is introduced into the system by way of a conduit 64. From this conduit 64 this material is introduced into a heating or liquefier vessel 65. In this vessel the crumb, extender oil, solvent and antioxidant are heated by coils 66 and the mixture agitated by an agitator apparatus 84. The warm or heated fluid rubber containing mixture is passed from the heater 65 by way of a conduit 67 to the suction side of a high pressure pump 68. This pump transfers or pumps this viscous mixture through a discharge line 69 into manifold lines 70 and 71 from which the charge material is injected at several points into the contacting vessel 63. Within the vessel 63 is provided numerous spray nozzles 72. The viscous rubber, extender oil and solvent material is sprayed under high pressure through the nozzles 72. The carbon black containing gases at about 300° F. or above are passed upward and in countercurrent relation to the sprayed material from the nozzles 72. By the time the sprayed composition reaches the bottom of vessel 63 it is intended that the high boiling rubber solvent be completely evaporated from the spray droplets by the upflowing hot carbon black containing gases. By the time the carbon black containing gases reach the top of vessel 63 the carbon black is fairly well stripped from the suspending gases. The gases and final traces of carbon black are removed from vessel 63 through a conduit 73 and are passed into a cyclonic separator 74. Any material not separated in separator 74 is passed through a conduit 75 and into a second cyclonic separator 76. Off gases from this second separator are passed through a conduit 77 for such disposal as desired. Bag filters may be used with or in place of the cyclones.

Since the velocity of the carbon black containing gases flowing upward through the treater vessel 63 is quite high substantially all of the rubber-extender oil carbon black agglomerates are removed from vessel 63 through conduit 73 for recovery in several cyclonic separators. Since this material to be separated is relatively heavy its separation in the cyclonic separators is quite efficient. Solid material separated in separator 74 is removed therefrom through a conduit 78 and this material may be passed on through a conduit 80 for storage or such other uses as desired. Material separated in separator 76 is removed therefrom through a conduit 79 and is passed through a conduit 81 for such disposal as desired. If desired, the material passing through conduit 80 may be combined with material passing through conduit 81 as a single product of the process.

Due to the relatively high velocity of the carbon black containing gases flowing upward in contactor vessel 63 there is very little solid material settling to the bottom of this contactor vessel. The material which does settle to the bottom of vessel 63 is removed therefrom through a conduit 82 and is passed to storage or other disposal as desired through conduit 83.

If desired the material separated in cyclonic separators 74 and 76 may be passed through conduits 78 and 79 and combined with the material in conduit 83.

Any number of rows of spray nozzles 72 may be provided in contacting vessel 63 in an attempt to agglomerate as nearly completely as possible all of the carbon black.

In the vessel 65 the rubber crumb, extender oil, solvent and antioxidant composition should be heated to such a temperature as will make this composition pumpable and sprayable and yet not heat it to such a high temperature as will degrade the rubber. I find that this temperature is above 275° F. for example 300° to 350° F. or even 400° F. The greater the proportion of extender oil and solvent in the crumb the less severe will need be the heating in vessel 65 to produce a pumpable and sprayable material.

When a rubber solvent is used in mixer 65 a solvent recovery step 86 should be used for economic reasons.

In the drawing and description such auxiliary apparatus parts as conveyor power equipment, temperature indicating, recording and controlling equipment, valves and other indicating and/or control apparatus have not been illustrated in the drawing nor described in the disclosure for purposes of brevity. The need and use of such equipment is well understood by those skilled in the art.

In the spray chamber 63 I spray, for example, from about 1½ parts of rubber-extender oil-antioxidant mixture on a solvent-free basis per part of carbon black to 5 parts of rubber-extender-antioxidant per part of carbon black. The specific ratio of introduction of the rubber-extender oil mixture will be dependent upon the carbon black loading desired in the final rubber-oil-carbon black mixture and the foregoing proportions are not intended to be limiting.

After spray contacting the rubber containing material at a relatively high temperature with the carbon black, the agglomerated material should be cooled somewhat so as not to degrade the rubber hydrocarbon in any manner.

Any of the extender oils ordinarily employed in rubber making operations may be used with the crumb rubber as herein disclosed. These oils in addition to the term extender oils are frequently known as rubber processing oils or plasticizers. Oils which may be used with crumb rubber for recovering carbon black include both saturated and unsaturated materials, the latter being those of the so-called vulcanizable plasticizer type. Examples of liquid plasticizers which are useful herein include liquid conjugated diolefins such as liquid polybutadiene, liquid polyisoprene, liquid polychloroprene, liquid polypiperylene, liquid polypentadiene, liquid butadiene-styrene and other liquid copolymers, hydroxylated derivatives of the foregoing polymers and copolymers and esters thereof, various hydrocarbon oils such as are obtained from catalytic cracking and dehydrogenation operations, extract oils from solvent extraction of lubricating oil stocks with furfural, phenol, etc., catalyst soluble oils from alkylation reactions, polymers from clay treating of cracked gasoline, and the like.

These processing oils may be incorporated into the rubber in the coagulation operation as is usually done commercially.

Standard antioxidants such as (PBNA) phenyl-B-naphthal amine, (BLE) a diphenyl amine reaction product with acetone and (Agerite Stalite) a mixture of mono- and diheptylated diphenyl amine may be used. These antioxidants may also preferably be incorporated into the rubber during the regular coagulation operation in which the crumb is produced. The presence of an antioxidant and the carbon black removal operation in a reducing atmosphere assist in prevention of the deterioration or degradation of the crumb rubber during the carbon black-crumb rubber contacting operation.

By use of an antioxidant such as the above mentioned PBNA, I am able to contact the crumb rubber with the carbon black containing furnace gases at temperatures as high as 500° F. However, it is preferable to maintain temperature within vessel 63 at temperatures below 400°, such as 300° F. or below. In the drawing the carbon black containing furnace gases are illustrated as entering the treating system at 300° F. This temperature may, however, be above or below this value in this carbon black feed line.

The conveyors and/or feeders for handling solid material herein disclosed may be selected from among such equipment commercially available and deemed suitable for the purpose at hand.

If desired, a small proportion of a thinning liquid, such as benzene or carbon tetrachloride, may be introduced into the mixing vessel 65 with the rubber and extender oil in line 64. Such a thinning agent will assist in making the crumb rubber-extender oil composition more easily pumpable. When such a thinning liquid is used a thinning liquid recovery apparatus 86 should be employed to prevent loss in the clean off-gas issuing from separator 76 through conduit 77.

The thinning liquid will vaporize from the rubber-extender oil composition as the composition is sprayed through nozzles 72 into the stream of warm carbon black in vessel 63.

While certain embodiments of the invention have been described for illustrative purposes, the invention obviously is not limited thereto.

Having disclosed my invention, I claim:

1. A method for separating and collecting carbon black from carbon black production furnace effluent gases comprising intimately contacting said furnace effluent with a viscous but pumpable composition made by mixing crumb rubber, an antioxidant and an extender oil, and separating said composition with adhering carbon black and gases of decreased carbon black content as separate products of the process.

2. The method of claim 1 wherein the composition is sprayed into contact with the carbon black containing gases.

3. A method for separating and collecting carbon black from carbon black production furnace effluent gases comprising intimately contacting said furnace effluent with a viscous but pumpable composition made by mixing crumb elastomer, an antioxidant and an elastomer processing oil, and separating said composition with adhering carbon black and gases of decreased carbon black content as separate products of the process.

4. The method of claim 3 wherein the composition is sprayed into contact with the carbon black containing gases.

5. A method for separating and collecting carbon black from carbon black production furnace effluent gases comprising spraying a viscous but pumpable mixture made by mixing coagulated elastomer crumb, an antioxidant and an extender oil into a contacting zone, introducing carbon black production furnace effluent gases containing carbon black in suspension into said zone countercurrently with respect to the direction of spray, removing agglomerates of sprayed mixture containing carbon black and gases of reduced carbon black content from one end of said contacting zone, separating the removed agglomerates of sprayed mixture containing carbon black from the gases of reduced carbon black content in a cyclonic operation, and recovering the agglomerates containing carbon black as one product and gases of reduced carbon black content as another product of the process.

6. The process of claim 5 wherein the liquid mixture of coagulated elastomer crumb, antioxidant and extender oil is sprayed into the carbon black containing gases at a temperature below 400° F.

7. The process of claim 5 wherein the liquid mixture of coagulated elastomer crumb, antioxidant and extender oil is sprayed into the carbon black containing gases at a temperature between 300° and 400° F.

8. In the process of claim 5, recovering the agglomerates containing carbon black from the gases of reduced carbon black content by an electrostatic separation operation.

9. In the process of claim 5, recovering the agglomerates containing carbon black from the gases of reduced carbon black content by a cyclonic operation.

10. A method for separating and collecting carbon black from carbon black production furnace effluent comprising intimately contacting said furnace effluent with a viscous but pumpable composition made by mixing crumb rubber, an antioxidant, a rubber solvent and an extender oil, and separating said composition with adhering carbon black and gases of decreased carbon black content as separate products of the process.

11. The method of claim 10 wherein the composition is sprayed into contact with the carbon black containing gases.

12. The method of claim 10 wherein the rubber solvent is benzene.

13. The method of claim 10 wherein the rubber solvent is carbon tetrachloride.

References Cited in the file of this patent

UNITED STATES PATENTS 2,585,659   Kilpatrick _____ Feb. 12, 1952